United States Patent [19]

Kassai

[11] Patent Number: 4,625,986
[45] Date of Patent: Dec. 2, 1986

[54] VELOCIPEDE

[75] Inventor: Kenzou Kassai, Osaka, Japan

[73] Assignee: Aprica Kassai Kabushikikaisha, Osaka, Japan

[21] Appl. No.: 742,886

[22] Filed: Jun. 10, 1985

[30] Foreign Application Priority Data

Jul. 19, 1984 [JP] Japan ................... 59-150828

[51] Int. Cl.$^4$ .................. B62J 1/00; B62K 5/06
[52] U.S. Cl. .................. 280/282; 297/195; 297/443
[58] Field of Search .................. 280/282, 7.1, 7.15, 280/7.16, 7.17; 297/443, 243, 195, DIG. 1

[56] References Cited

U.S. PATENT DOCUMENTS

| | | | |
|---|---|---|---|
| 2,068,125 | 1/1937 | Kraeft | 280/282 X |
| 3,771,827 | 11/1973 | Winfree | 297/195 X |
| 4,111,446 | 9/1978 | Kassai | 280/282 X |
| 4,462,634 | 7/1984 | Hanagan | 297/243 X |

Primary Examiner—John A. Pekar
Attorney, Agent, or Firm—W. G. Fasse; D. H. Kane, Jr.

[57] ABSTRACT

A velocipede has a divided frame with a lower frame half and an upper frame half forming on its upper surface a centrally disposed seat surface or saddle (2), a front leg (5) having one front wheel (4) on its lower end and supported for turning movement with respect to the frame so as to change the direction of the front wheel, a handle shaft (6) fixedly connected to the front leg and having a handle (7) at its upper end, and a rear leg (11) extending rearwardly and downwardly from the frame. Two rear wheels (12) are attached to the rear leg or legs. The saddle-shaped upper frame half (15) and the lower frame half (14) are separately prepared so that any one of a plurality of saddle shaped upper frame halves may be combined with a single lower frame half for modifying the appearance. The upper half is journalled at its front end to the lower half by a pivot pin (25) extending widthwise of the velocipede to provide a clearance between the upper and lower halves. The upper half is supported by compression springs (22) with respect to the lower half, whereby the upper half is downwardly turnable with respect to the lower half against the forces of the compression springs for a cushioning effect.

4 Claims, 12 Drawing Figures

VELOCIPEDE

BACKGROUND OF THE INVENTION

This invention relates to a velocipede and particularly to improvements in the construction of the frame portion of a velocipede which is disposed between the wheels and which has an upper surface forming a seat surface.

Velocipedes now on the market are of various designs. Purchasers are likely to select and buy those they like. Thus, it is often found that one and the same manufacturer produces some velocipedes of different designs in order to meet most of the purchaser's tastes.

To produce velocipedes, first, a design is determined and then molds or tools are prepared to produce corresponding parts. However, such molds or tools are very expensive and many kinds of molds or tools are required to produce a variety of velocipedes, a fact which can be a heavy economic burden to the manufacturer if he fails to find a market for economically feasible number of velocipedes. Nevertheless, it cannot be overlooked that the market is calling for a variety of velocipedes.

SUMMARY OF THE INVENTION

Accordingly, an object of this invention is to provide a construction for a simple velocipede which can be easily produced while changing its appearance at low cost.

What has led to the accomplishment of this invention is the attention to the following points in the engineering design of velocipede: To provide many kinds of velocipedes, respective corresponding numbers of parts are required. As a result, it is necessary to prepare various molds or tools for obtaining respective parts. Such need, however, is disadvantageous from the standpoint of cost, as already described. On the other hand, when a velocipede is looked at as a whole, it is noticed that the frame usually carrying the saddle disposed in the middle of the frame is the most important portion that determines the impression or appearance of the velocipede. In fact, viewing velocipedes on the market, we often feel that the visual impression of a velocipede changes to a great extent according to the design of its frame. In this sense, even in the case where many kinds of velocipedes are to be obtained, this can be attained simply by changing the design of the frame alone while using other parts in common.

In recent velocipedes, the frame is in many cases formed of rigid plastic material. Thus, when it is desired to obtain several kinds of frames, different molds become necessary, one for each different frame type. This situation also leads to an increase in cost as in the case of the aforesaid situation in which small numbers of many different types are sold, thus failing to bring about a basic solution to the problem of an economically achieved diversity. Accordingly, further attention has been paid to the following fact concerning the frame.

Paying attention to such frame alone reveals that the portion that most easily comes in sight is the upper surface or upper half of the frame. This means that in the design phase of a frame, a change of only the upper half thereof is effective to greatly change the impression of the external appearance of the entire frame and hence of the entire velocipede.

Accordingly, this invention may employ a method wherein the upper and lower frame halves are separately prepared and then put together to thereby form a frame.

Further, the method of producing a velocipede according to the invention comprises the steps of preparing a plurality of parts having respective specific external appearances to serve as upper frame halves while preparing the remaining parts of a velocipede as common parts except the upper half of the frame, selecting one out of the plurality of upper frame halves, and connecting said selected upper frame half to the lower frame half included in the remaining common parts of a velocipede.

According to the velocipede of this invention, since its frame is formed by combining separately prepared upper and lower halves, the visual impression or appearance of the entire frame can be easily changed by changing the external appearance of the upper half alone, a fact which is useful to obtain many kinds of velocipedes. It is true that in this invention, to obtain a single frame, two molds are required to separately form upper and lower halves. However, where many different types of frames are to be obtained, only molds for making upper frame halves must be prepared according to the number of different upper frame halves. Generally, molds of greater size are more expensive, and when it is desired to obtain a molding of greater size, a molding machine which is more expensive and of greater size is required. For this reason, it may be said that when many different frame types are to be made, the method of dividing the frame into upper and lower halves is more advantageous in that smaller-sized molds and a smaller-sized molding machine will do, even if the number of molds for obtaining a single frame increases. Since a mold for obtaining an upper half alone is relatively small in size, there will not be so much increase in cost even if many different types are prepared. More importantly, it is advantageous that the other parts of the velocipede including the lower frame half can be used in common. Further, in the case where the frame is molded of plastic material, if its upper and lower halves are separately produced, a construction can be easily attained in which these frame halves define a space therebetween when the frame halves are assembled. Such space makes it possible to install another part therein. If the assembling of velocipedes are so arranged that the step of connecting the upper half to the lower half is performed after other parts have been assembled, then the assembling of other parts, for example, the lower half of the frame and the front leg, handle shaft or rear leg can be performed on the upper surface of the lower half of the frame, so that the assembling steps become easier, and since screws and other parts used in the assembling can be concealed by the upper half, screws and other relatively unsightly parts used for the assembly can be concealed inside the completed velocipede.

Further, according to the method of producing velocipedes of this invention, by simply preparing a plurality of upper frame halves having respective differing external appearances and by simply selecting suitable ones, many kinds of velocipedes differing in visual impressions or appearances can be easily produced. For example, it is possible to sell a velocipede after attaching an upper torso half in the store according to the taste of the purchaser.

DESCRIPTION OF PREFERRED EXAMPLE EMBODIMENTS AND OF THE BEST MODE OF THE INVENTION

Figure 1:
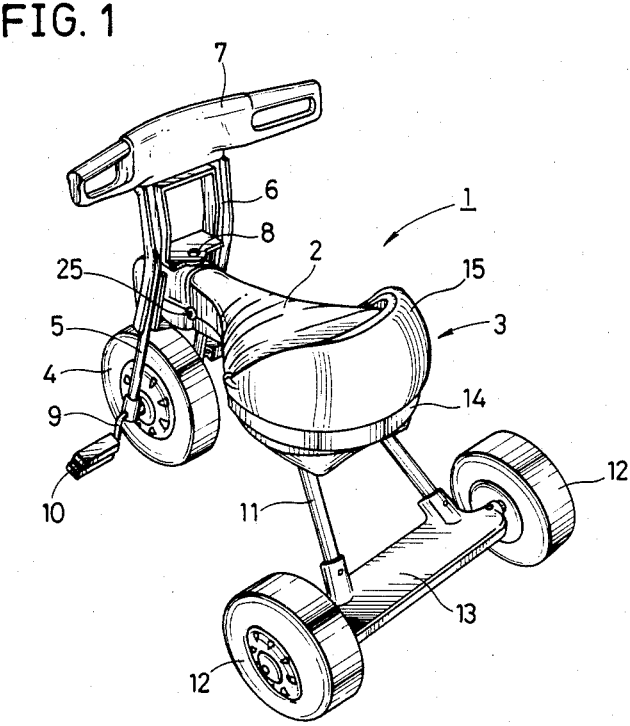
FIG. 1 is a rear perspective view of an embodiment of a velocipede according to this invention.

As shown in the rear perspective view of FIG. 1, the velocipede 1 has a frame or body 3 disposed in the middle between the, front and rear, said body forming the upper surface of a seat or saddle 2. Disposed forwardly of the body or frame 3 are a front leg structure 5 having one front wheel 4 at its lower end, a handle shaft 6 integrally extending from said front wheel structure 5, and a handlebar 7 attached to the upper end of the handle shaft 6. The structure assembly extending from the handlebar 7 to the front wheel structure 5 is supported for rotation on a shaft 8 relative to the frame or body 3 so that the direction of the front wheel 4 can be changed. The front wheel 4 has pedals 10 attached thereto through a crank shaft 9. Extending rearwardly downwardly of the frame or body 3 are rear legs 11 attached to the frame or body 3, the lower end of said rear legs having two rear wheels 12 attached thereto through a step 13 extending between these rear wheels 12.

Figure 6:
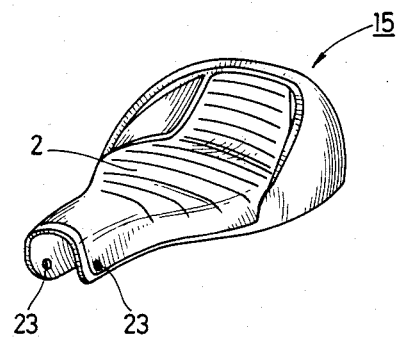
FIG. 6 is a perspective view of the upper frame half of the frame or body of FIG. 1 forming simultaneously a saddle.
Figure 7:
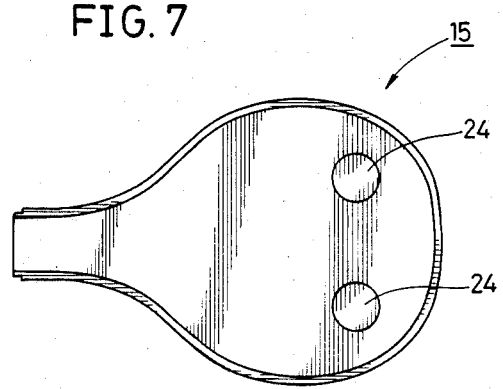
FIG. 7 is a bottom view of the saddle.

The frame or body 3 of the velocipede 1 comprises a combination of a lower half 14 shown in FIGS. 2 to 5 and an upper half 15 shown in FIGS. 6 and 7. These lower and upper halves 14 and 15 separately molded parts of plastic material.

Figure 2:
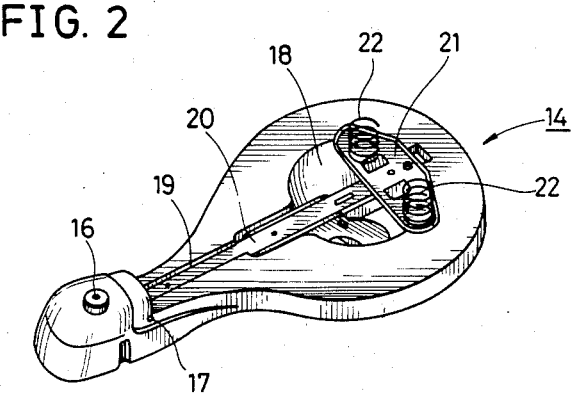
FIG. 2 is a perspective view of the lower half of the frame or body of the velocipede of FIG. 1.
Figure 3:
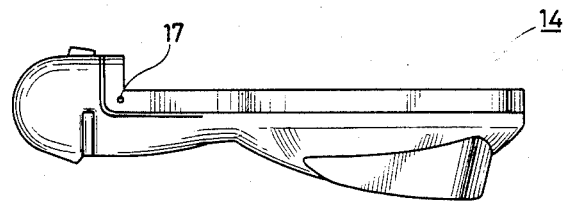
FIG. 3 is a side view of the lower frame half.
Figure 4:
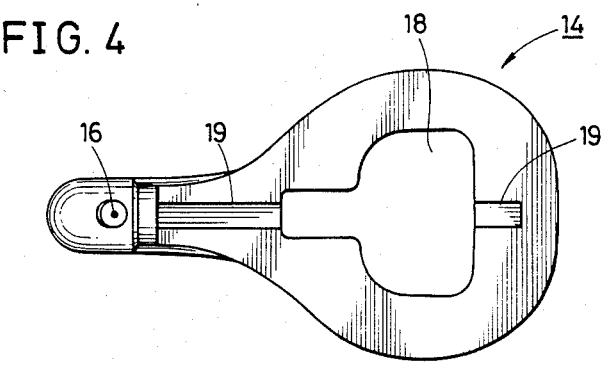
FIG. 4 is a plan view of the lower frame half.
Figure 5:
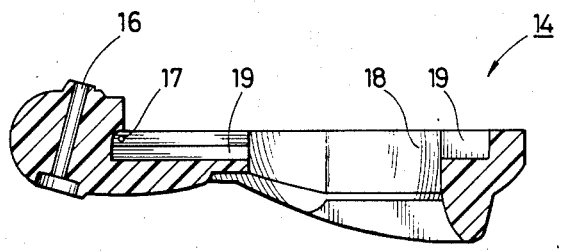
FIG. 5 is a central longitudinal section of the lower frame half.
Figure 8:
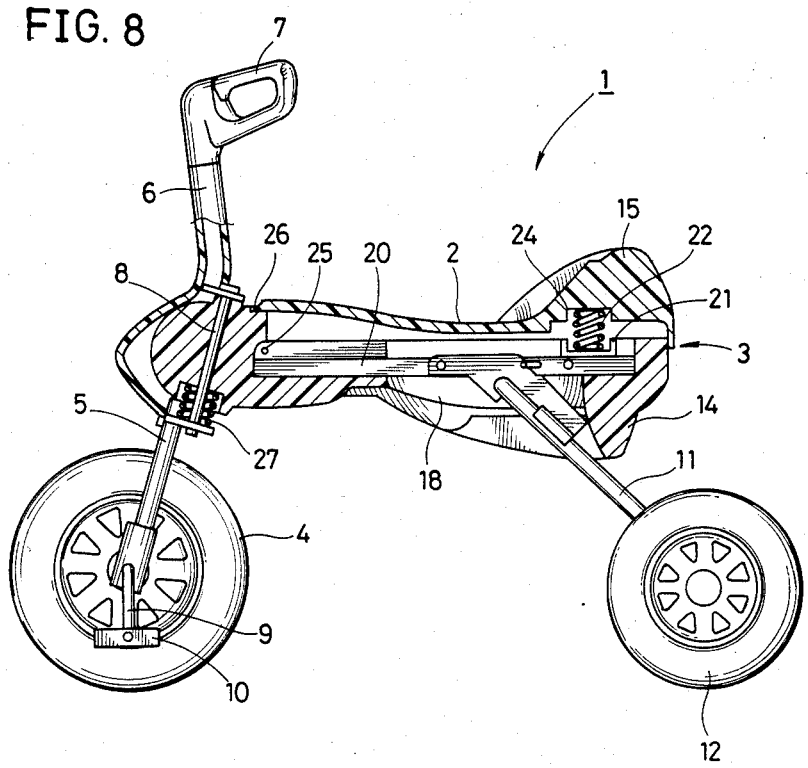
FIG. 8 is a side view of the velocipede of FIG. 1, with the frame or body shown in section.

The lower half 14 of the frame or body 3 plays an important role in the assembly and construction of the velocipede 1 as most of the other parts included in the velocipede 1 are attached to said lower half 14. For example, the front end of the lower half has a throughgoing hole 16 through which the aforesaid shaft 8 extends. The front end also has a throughgoing hole 17 extending widthwide of the velocipede 1. This throughgoing hole 17 is used for attaching the upper half 15 to the lower half 14 of the frame or body 3. Further, a large vertical hole 18 is formed in a relatively rear region of the lower half 14. The upper surface of the lower half 14 has longitudinally extending grooves 19 positioned fore-and-aft of the hole 18 thus forming extensions of the hole. The grooves 19, as shown in FIG. 2, have positioned therein a spine member 20 of metal, to which, as shown in FIG. 8, the upper ends of the rear legs 11 extending through the hole 18 are attached. A washer 21 is fixed to the rear end of the spine member 20. Two compression springs 22 are disposed on the washer 21.

The upper half 15 of the frame or body 3, as shown in FIGS. 6 and 7, has the form of a saddle providing the seat surface 2 on its upper surface. The upper half 15, as another configurational feature, has its rear end raised relatively high. The front end of the upper half 15 is shaped to cover the lower half 14 and has throughgoing holes 23 extending widthwide of the velocipede 1. Further, the lower surface of the upper half 15 has recesses 24, which have, for example, a circular planar form, at positions corresponding to the positions of said compression springs 22.

In FIG. 8, the velocipede 1 is shown in side view, with the torso 3 shown in section. To produce the velocipede 1 of such a construction, the assembling of at least the lower half 14 of the frame or body 3 and of the rear leg 11 is performed preferably before the upper half 15 is connected to the lower half 14, because, for example, the operation of attaching the spine member 20 to the lower half 14 or attaching the spine member 20 to the rear legs 11 is easier to perform when the upper half 15 has not yet been placed on the lower half 14. The upper half 15 is placed on the lower half 14 with the upper ends of the compression springs 22 received in the recesses 24. Then the upper half is joined to the lower half 14 by inserting a pivot pin 25 through the throughgoing holes 23 and 17. In this state, the upper half 15 is urged by the compression springs 22 to turn upwardly around the axis of the pivot pin 25, the terminal end of such turning movement being defined by the front edge 26 of the upper half 15 abutting against a portion of the lower half 14. In the mounted state, the upper half 15 is supported by the compression springs 22 in such a manner as to define a suitable space between the upper and lower halves 15 and 14. For this purpose the upper half 15 is turnable downwardly relative to the lower half 14 against the forces of the compression springs for providing a cushioning for a child sitting on the seat surface 2 of the upper half 15.

As shown in FIG. 8, the lower edge of the upper half 15 covers the peripheral edge of the upper surface of the lower half 14. Thus, there is no danger of a finger being caught in the clearance between the upper and lower halves 15 and 14 even if the upper half 15 is vertically moved with expansion and contraction of the compression springs 22. Further, the spine member 20, the attaching portion between the spine member 20 and the rear legs 11, the screws, the holes and other unsightly portions are concealed by the upper half 15 covering the lower half 14. Therefore, such construction provides a desirable external appearance of the velocipede 1.

In this velocipede 1, in addition to said compression springs 22, a compression spring 27 is disposed along the shaft 8. This compression spring 27 also serves to provide a cushioning effect.

Figure 9:
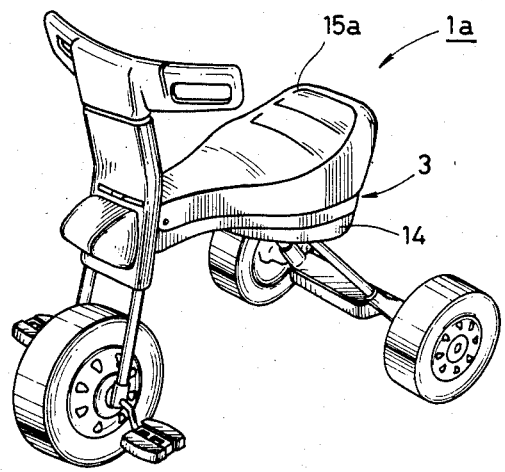
FIG. 9 is a front perspective view of a second example of a velocipede according to this invention.
Figure 10:
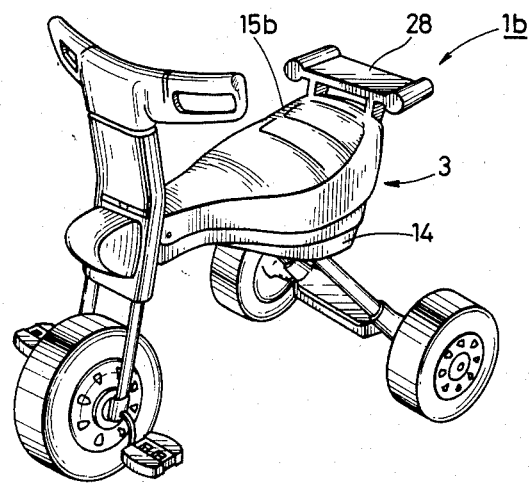
FIG. 10 is a front perspective view of a third example of a velocipede according to this invention.

FIG. 9 illustrates a front perspective view of a velocipede 1a of a different appearance compared to that of the velocipede shown in FIG. 1 while FIG. 10 shows yet another embodiment 1b. Although the velocipedes 1a and 1b shown in FIGS. 9 and 10 use many parts in common with the velocipede 1 shown in FIG. 1, they nevertheless have their respective unique external appearances. That is, with attention paid to the body or frame 3, in FIG. 9, a substantially flat upper half 15a provides a sporty appearance. In the example shown in FIG. 10, the upper half 15b is similar to the upper half 15a shown in FIG. 9 but an accessory 28 is attached. The other parts including the lower half 14 are the same as those shown in FIG. 1.

Figure 11:
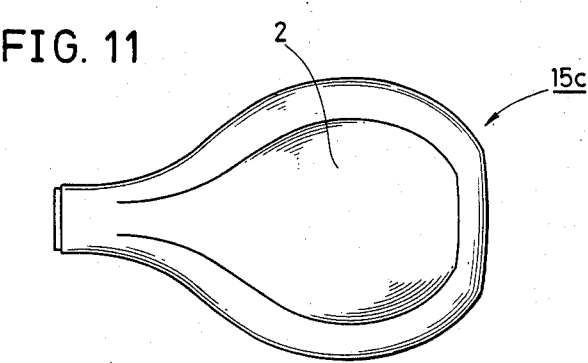
FIG. 11 is a plan view of the upper half of a frame or body also forming a saddle used in a further embodiment of a velocipede according to this invention.
Figure 12:
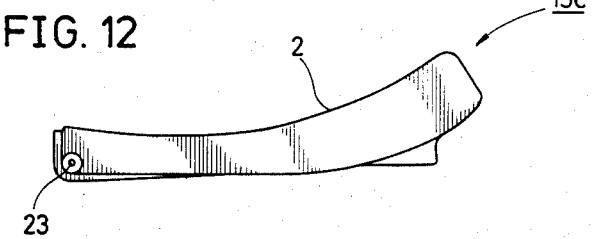
FIG. 12 is a side view of the upper frame half or saddle of FIG. 11.

In this manner, if various forms are prepared as upper halves for the frame or body 3, the visual impression of the entire velocipede can be made to differ to a substantial extent. A further example of an upper half is shown in FIGS. 11 and 12 showing an adaptation for a relatively big child. Nevertheless, the lower edge of the upper half 15c is adapted to fit to the aforesaid lower half 14.

The shapes of the upper and lower halves 15 and 14 described so far with reference to the drawings could be modified variously. The upper halves the shape of which can be changed while using a common lower half are not limited to the examples shown in the drawings and many other changes could be made.

Further, as a method of connecting the upper half to the lower half, if the pivot pin 25 is used to allow the upper half to vertically turn, then there is an advantage that it is possible to provide a cushioning effect by arranging the compression springs 22. If, however, such advantage is not desired, the pivot pin 25 is omitted and the upper half is simply rigidly attached to the lower half.

Further, where many kinds of upper halves are desired, changes in their color may be made. Thus, the visual impression of the whole can also be changed by simply using upper halves of different colors while using lower halves of a common color.

Although the present invention has been described and illustrated in detail, it is clearly understood that the same is by way of illustration and example only and is not to be taken by way of limitation, the scope of the present invention being limited only by the terms of the appended claims.

What is claimed is:

1. A velocipede, comprising frame means including on its upper surface a centrally disposed seat surface, front leg means having front wheel means attached to a lower end of said front leg means, means securing said front leg means to said frame means for a turning movement with respect to said frame means so as to change the direction of said front wheel means, a handle shaft fixedly connected to said front leg means, handle means at an upper end of said handle shaft, rear leg means extending rearwardly and downwardly from said frame means, two rear wheels secured to a lower end of said rear leg means, said frame means comprising separately prepared upper and lower halves, said upper half comprising a saddle providing said seat surface, pivot pin means turnably connecting said upper half at its front end to said lower half, said pivot pin extending widthwise of said velocipede, said upper half and said lower half being so constructed that a clearance is defined between said upper and lower halves, and compression spring means arranged in said clearance for supporting said upper half with respect to said lower half, whereby said upper half is turnable downwardly with respect to the lower half against the forces of said compression spring means for providing a cushioning effect when said upper half is pivoting downwardly about said pivot pin.

2. The velocipede of claim 1, wherein said upper half has a lower edge shaped such that it covers a peripheral edge of an upper surface of said lower half.

3. The velocipede of claim 1, wherein said upper half is a molding of plastic material.

4. A method for manufacturing a velocipede, which includes a frame forming on its upper surface a centrally disposed seat surface, front leg means having one front wheel at its lower end and supported for turning movement with respect to the frame so as to change the direction of the front wheel, a handle shaft fixedly connected to the front leg means and having a handle at its upper end, and rear leg means extending rearwardly and downwardly from said frame, said rear leg means having two rear wheels at its lower end, comprising the steps of: preparing a plurality of upper frame halves for said frame, said upper frame halves having respective specific external appearances and an upper surface forming a saddle, preparing the remaining parts of the velocipede, excluding said upper frame halves for said frame, but including a lower frame half as common parts, selecting one out of said plurality of upper frame halves, hinging the selected upper frame half at its front end to said lower frame half including said remaining common parts of the velocipede so as to provide a clearance between said saddle forming upper frame half and said lower frame half, and arranging compression spring means in said clearance between said saddle forming upper frame half and said lower frame half for providing a cushioning effect when said saddle forming upper frame half tilts toward said lower frame half.

* * * * *